United States Patent
Mathiak et al.

(10) Patent No.: US 11,643,327 B2
(45) Date of Patent: May 9, 2023

(54) METHOD FOR THE CATALYTIC OXIDATION OF AMMONIA GAS

(71) Applicants: thyssenkrupp Industrial Solutions AG, Essen (DE); thyssenkrupp AG, Essen (DE)

(72) Inventors: Jens Mathiak, Castrop-Rauxel (DE); Michael Groves, Gevelsberg (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 340 days.

(21) Appl. No.: 16/616,775

(22) PCT Filed: May 30, 2018

(86) PCT No.: PCT/EP2018/064189
§ 371 (c)(1),
(2) Date: Nov. 25, 2019

(87) PCT Pub. No.: WO2018/220014
PCT Pub. Date: Dec. 6, 2018

(65) Prior Publication Data
US 2021/0171348 A1 Jun. 10, 2021

(30) Foreign Application Priority Data
Jun. 1, 2017 (DE) .................. 10 2017 209 257.2

(51) Int. Cl.
*C01B 21/28* (2006.01)
*C01B 21/26* (2006.01)

(52) U.S. Cl.
CPC .............. *C01B 21/28* (2013.01); *C01B 21/26* (2013.01)

(58) Field of Classification Search
CPC .......... C01B 21/28; C01B 21/26; C01B 21/40
See application file for complete search history.

(56) References Cited

U.S. PATENT DOCUMENTS 987,375 A * 3/1911 Kaiser .................... C01B 21/26
423/403
1,954,317 A 4/1934 Hobler
(Continued)

FOREIGN PATENT DOCUMENTS

| CN | 101284656 B | 9/2010 |
| CN | 106371480 A | 2/2017 |

(Continued)

OTHER PUBLICATIONS

English Translation of International Search Report issued in PCT/EP2018/064189, dated Aug. 15, 2018 (dated Aug. 30, 2018).

*Primary Examiner* — Anthony J Zimmer
(74) *Attorney, Agent, or Firm* — thyssenkrupp North America, LLC

(57) ABSTRACT

A process for catalytic oxidation of ammonia gas by way of an oxygen-containing gas in a presence of a noble metal-containing catalyst may be employed to give nitrogen monoxide. A temperature of an ammonia/air mixed gas may be optimized in respect of nitrogen monoxide selectivity of the reaction before contact with the catalyst. Examination of catalytic $NH_3$ oxidation according to $4NH_3 + 5O_2 \rightarrow 4NO + 6H_2O$ revealed that an optimum mode of operation of an $NH_3$ burner in an $HNO_3$ plant is not to be achieved by maintenance of a constant gauze temperature of the catalyst gauze by automatic setting of the $NH_3$:air ratio. Rather, there is an optimum temperature for each process condition that should be set not by changing the $NH_3$:air ratio but instead by altering the temperature of the $NH_3$/air mixed gas before contact with the catalyst gauzes.

17 Claims, 1 Drawing Sheet

(56) References Cited

U.S. PATENT DOCUMENTS

| | | | |
|---|---|---|---|
| 2,018,249 A | 10/1935 | Caro | |
| 2,135,733 A * | 11/1938 | Richardson | C01B 21/26 423/392 |
| 2,201,958 A | 5/1940 | Richardson | |
| 2,697,652 A * | 12/1954 | Edmunds, Jr. | C01B 21/26 422/111 |
| 4,512,964 A * | 4/1985 | Vayenas | B01J 15/005 423/403 |
| 4,863,893 A | 9/1989 | Farrauto et al. | |
| 5,985,230 A | 11/1999 | Vlaming | |

FOREIGN PATENT DOCUMENTS

| | | |
|---|---|---|
| DE | 622726 C | 12/1935 |
| DE | 1040002 B | 10/1958 |
| DE | 69708818 T | 6/2002 |
| EP | 0 259 966 A1 | 3/1988 |
| EP | 3 210 939 A1 | 8/2017 |
| KR | 100976372 B | 8/2010 |
| WO | 01/68520 A | 9/2001 |
| WO | 2009054728 A | 4/2009 |

* cited by examiner

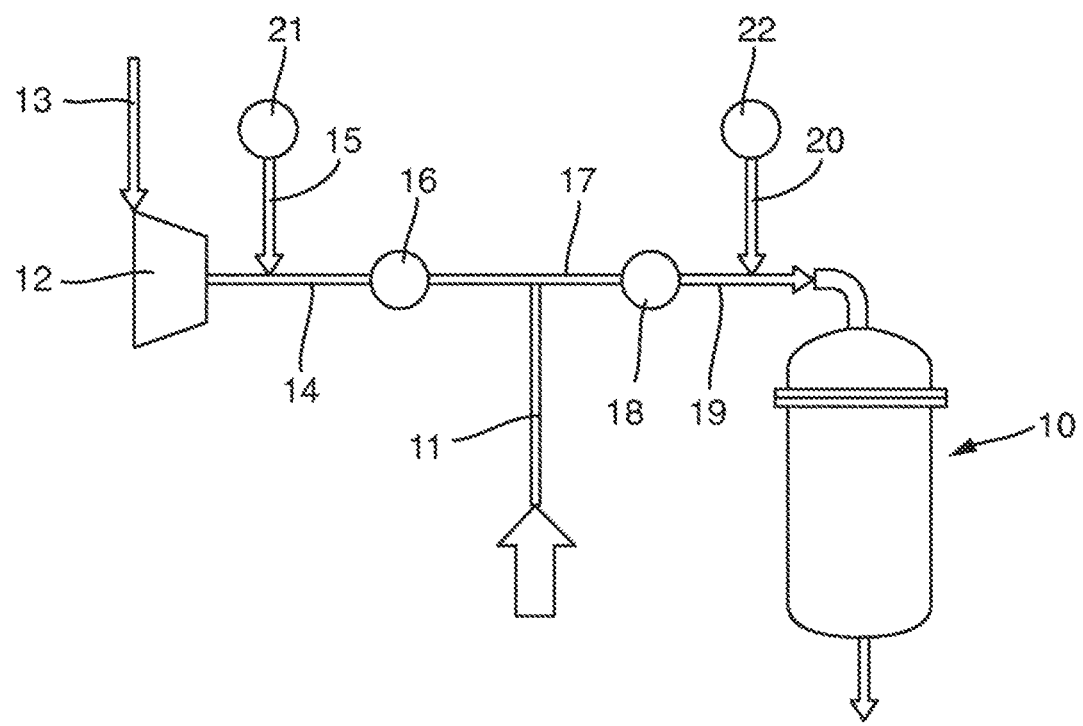

METHOD FOR THE CATALYTIC OXIDATION OF AMMONIA GAS

CROSS REFERENCE TO RELATED APPLICATIONS

This application is a U.S. National Stage Entry of International Patent Application Serial Number PCT/EP2018/064189, filed May 30, 2018, which claims priority to German Patent Application No. DE 10 2017 209 257.2, filed Jun. 1, 2017, the entire contents of both of which are incorporated herein by reference.

FIELD

The present disclosure generally relates to processes for the catalytic oxidation of ammonia gas by way of oxygen-containing gas in the presence of a catalyst to give nitrogen monoxide.

BACKGROUND

In the preparation of nitric acid by the Ostwald process, a gas mixture containing nitrogen oxides, water vapor, oxygen and other materials which do not participate in the subsequent reactions is formed by oxidation of ammonia in atmospheric oxygen or in specific cases in other oxygen-containing mixtures such as water vapor and oxygen or oxygen-enriched air. The nitrogen oxides are nitrogen monoxide (NO), nitrogen dioxide ($NO_2$), dinitrogen oxide ($N_2O$), dinitrogen tetroxide ($N_2O_4$) and dinitrogen trioxide ($N_2O_3$) which are formed under the appropriate conditions on reaction with water and optionally oxygen, forming aqueous solutions of nitric acid ($HNO_3$) and nitrous acid. The gas mixture formed in the oxidation of ammonia is initially hot, typically in the region of about 900° C., and is cooled in the plant by heat exchange with other streams in suitable apparatuses.

WO 01/68520 A1 describes, for example, typical conventional processes for preparing nitric acid by oxidation of ammonia using atmospheric oxygen.

In the preparation of nitric acid, ammonia is thus burnt by means of air in the presence of platinum gauzes or similar catalysts, for example platinum-rhodium catalyst gauzes. Here, a gas mixture of typically about 9-12% by volume of $NH_3$ and air is passed through the gauzes, and a temperature of about 800-950° C. is established at the gauzes due to the exothermic nature of the oxidation reaction. $NH_3$ is under these conditions oxidized very selectively to nitrogen monoxide (NO) (A, reaction scheme I), which is then oxidized in the course of the further process to nitrogen dioxide ($NO_2$) (B, reaction scheme II) and is finally reacted with water in an absorption apparatus to give $HNO_3$ (C, reaction scheme III).

A) Combustion of Ammonia in an Oxidation Reactor by Reaction of Ammonia with Oxygen to Give Nitrogen Oxide

The heat of reaction of this exothermic step is about −226 kJ/mol of NH3.

In the nitric acid process, a quantity of heat of not more than 226 kJ/mol of $HNO_3$, based on the end product, is thus generated as a result of this reaction step.

Even when the $O_2$ content of 21% by volume in the combustion air is accordingly just sufficient formally to ensure complete conversion of 10% by volume of $NH_3$ into $HNO_3$, further oxygen, in particular atmospheric oxygen (secondary air) is introduced into the process gas after the catalytic $NH_3$ oxidation and before entry into the absorption apparatus in the industrial preparation of $HNO_3$ in order to accelerate the subsequent NO oxidation to $NO_2$ and thus formation of $HNO_3$ in the absorption apparatus. The residual content of oxygen in the offgas leaving the last absorption apparatus is typically about 1-5% by volume.

B) Oxidation of Nitrogen Monoxide to Nitrogen Dioxide

The enthalpy of reaction of this exothermic step $\Delta H_r°$ is about 57.2 kJ/mol of NO. However, in the nitric acid process a quantity of heat of about 85 kJ/mol of $HNO_3$, based on the end product, is generated as a result of this reaction step since the absorption of $NO_2$ in water proceeds as a disproportionation with reformation of NO (cf. C) and NO has to be reoxidized.

In the nitric acid process according to the Ostwald process, the reaction proceeds as uncatalyzed gas-phase reaction.

C) Formation of $HNO_3$ (Nitric Acid) by Absorption of $NO_2$ in Water in the Condensers and the Absorption Tower with Reformation of NO

The heat of reaction of this exothermic step is about −58 kJ/mol of $HNO_3$.

The resulting net reaction is:

The process for preparing nitric acid is a large-scale industrial process. The methods of carrying out such processes are subject to continual optimization.

U.S. Pat. No. 2,201,958 A describes a process for preparing nitric acid in which a mixture of ammonia and air is firstly conveyed through a heat exchanger in order to preheat it before this gas mixture is introduced into an ammonia burner. As heating medium for this preheating of the reaction gas mixture, use is made of steam which is generated in a boiler by vaporization of water using the hot nitrogen oxides exiting from the ammonia burner as heat source for this vaporization process. The hot steam generated by heat exchange with the hot nitrogen oxides in the boiler is introduced into a steam drum and flows through this steam drum in countercurrent to the gas mixture composed of ammonia and air.

The patent document DE 622 726 A describes a method for the complete or virtually complete recovery of the work of compression in the preparation of nitric acid under superatmospheric pressure. In this method, air is compressed to a required operating pressure of 8 bar, liquid ammonia is injected by means of a metering pump into the air conduit and the compressed ammonia/air mixture is then conveyed through a heat exchanger in order to preheat it to a temperature of 330° C. The oxidation subsequently occurs in a reactor to form nitrogen oxides and the hot nitrogen oxides are conveyed through the heat exchanger in order to preheat the ammonia/air mixture.

Thus a need exists to improve the efficiency of a process for the catalytic oxidation of ammonia gas, which represents a further substep in the preparation of nitric acid, and to increase the yield of process product and reduce the plant costs.

BRIEF DESCRIPTION OF THE FIGURE

FIG. 1 is a schematic view of an example apparatus of the present disclosure.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to the invention, the reaction temperature at the catalyst is influenced so as to bring it to an optimum value in respect of the nitrogen monoxide selectivity of the reaction, with this influencing being effected by means of measures upstream of the oxidation reactor. In other words, according to the invention an influence is exerted on parameters which change the composition or temperature of the process gas mixture before it goes into the oxidation reactor in such a way as to lead to an increased reaction temperature at the catalyst in the oxidation reactor.

In contrast, the ammonia/air ratio has hitherto been used as influencing variable in the catalytic oxidation of ammonia gas in order to set the thermodynamically optimum composition of the process gas mixture and to regulate the optimum temperature for the catalytic reaction. The present invention, on the other hand, recommends providing a temperature regulation which is independent of the abovementioned influencing variable.

A more precise examination of the process of catalytic $NH_3$ oxidation according to the above reaction equation (I) has led to the recognition that the optimum mode of operation of an $NH_3$ burner in an $HNO_3$ plant cannot be achieved by maintaining a constant gauze temperature of the catalyst gauze by automatic setting of the $NH_3$:air ratio. Rather, there is an optimum temperature for each operating condition which should not be set by changing the $NH_3$:air ratio but instead by adapting the reaction temperature.

A preferred further development of the inventive achievement of the object provides for the air and/or the ammonia/air mixed gas to be indirectly heated or cooled before contact with the catalyst.

Indirect heating of the air and/or the ammonia/air mixed gas by means of steam or another heat transfer medium, in particular by means of residual gas and/or secondary air and/or electric power, is preferably provided.

For example, in a possible variant of the invention, indirect heating of the process air by means of a heater installed in a primary air conduit can be provided.

A preferred further development of the invention provides for the catalytic oxidation to be carried out in a plant comprising a process air compressor with an intermediate cooler, with a regulated process air-side bypass around the intermediate cooler being provided in order to set the exit temperature of the air exiting the process air compressor.

As an alternative to the abovementioned variants, the air and/or the ammonia/air mixed gas can also be directly heated or cooled before contact with the catalyst. For example, the catalytic oxidation can be carried out in a plant comprising a process air compressor and the process air stream can be mixed with at least one hot medium and/or at least one cold medium upstream or downstream of the process air compressor.

The hot or cold medium can, for example, be mixed with the total air stream or only with the primary air.

In a further development of this variant of the process of the invention with direct heating, demineralized water and/or liquid nitrogen and/or cold water, in particular from the $NH_3$ vaporization, is, for example, used as cold medium.

In a possible variant of the invention, heating by mixing-in of steam upstream of the process air compressor, for example, can be provided.

As an alternative thereto, it is also possible to provide, for example, heating or cooling of the ammonia/air mixed gas by mixing-in of steam downstream of the process air compressor. When steam is added before the process air compressor, heating is effected but when the steam is mixed in downstream of the process air compressor the mixed gas (air and medium) becomes hotter or colder than the process gas before mixing depending on whether the steam is hotter or colder than the process air.

When demineralized water is used as direct coolant for the ammonia/air mixture, it is advisable to take particular precautions against liquid water droplets being carried to the catalyst burner gauzes.

A possible variant of the process according to one further development of the invention provides for heating of the air and/or the ammonia/air mixed gas before contact with the catalyst, with the use of a fuel gas, in particular the use of hydrogen as fuel gas, for increasing the burner temperature coming into consideration. Here, either a fuel gas is introduced into the air stream in the region of the conduit upstream of the addition of ammonia with combustion of this fuel gas or else a fuel gas or a medium which influences the temperature of the reaction over the catalyst is introduced downstream of the addition of ammonia, with the combustion of this fuel gas occurring at the catalyst in the ammonia burner.

The abovementioned introduction of a fuel gas or a medium which influences the temperature of the reaction over the catalyst can thus be provided, according to what has been said above, either upstream or downstream of the addition of ammonia, or such an addition of a fuel gas can occur both upstream and downstream of the addition of ammonia.

In a preferred further development of the invention, it is also possible, for example, to provide a first introduction of a fuel gas or a medium which influences the temperature of the reaction over the catalyst upstream of the addition of ammonia and provide a further introduction of a fuel gas or a medium which influences the temperature of the reaction over the catalyst downstream of the addition of ammonia. In this variant, it is possible to exert an influence on the temperature at the catalyst in the oxidation reactor at two different places in the system.

Another further development of the invention provides indirect heating or cooling of the air by means of a first indirect heat exchanger before the addition of ammonia and/or indirect heating or cooling of the ammonia/air mixed gas by means of a second heat exchanger after the addition of ammonia. In this variant, too, it is possible to exert an influence on the temperature at the catalyst in the oxidation reactor at two different places in the system.

Another preferred further development of the invention provides for the catalytic oxidation to be carried out in a plant comprising a process air compressor and a change in the temperature of the combustion air to be provided by means of a change in at least one adjustment parameter of the process air compressor, preferably by means of a change in the setting of the blades of the process air compressor. A change in the temperature of the combustion air can thus be achieved by altering the efficiency of the process air compressor. This in turn leads ultimately to a setting of the gauze temperature of the catalyst gauze. An optimized mode of operation of the plant can thus be achieved via adjustment in the region of the process air compressor.

An alternative variant of the process according to a further development of the invention provides for regulation of the temperature of the catalyst gauze. For this purpose, it is possible, for example, to determine the intended value of the temperature of the catalyst gauze as a function of at least one modeling parameter, with, in particular, the $NH_3$ concentration and/or the plant load and/or the burner pressure being selected as modeling parameter, using a regulating circuit in order to set the amount of heating or cooling medium introduced and/or adjusting the setting of the process air compressor.

In the abovementioned variant, preference is given to using a cascade control, with the output from a temperature regulator for the temperature of the catalyst gauze being able to provide the intended value for a flow regulator for the heating and/or cooling medium.

An alternative possible way of regulating the temperature of the catalyst gauze is, for example, to set up a model for the behavior of the plant in respect of variations of the amount of heating medium and/or amount of cooling medium and/or changes in the settings of the process air compressor by means of plant data and also theoretical approaches, using a feed-forward control. with feedback trim. In the case of this variant of the process, the regulator should if possible react more quickly than when using a conventional regulating strategy.

The present invention further provides an apparatus for carrying out a process for the catalytic oxidation of ammonia gas by means of an oxygen-containing gas, in particular by means of air, in the presence of a catalyst to give nitrogen monoxide, preferably for carrying out the above-described process, with this apparatus comprising, according to the invention, means for setting the temperature of an ammonia/air mixed gas before contact with the catalyst.

Suitable catalysts for the catalytic oxidation of ammonia gas are known to those skilled in the art and will therefore not be set forth in detail here. For example, platinum-rhodium catalysts are used in industry.

The apparatus of the invention particularly preferably comprises at least one heating device and/or at least one cooling device for the air and/or the ammonia/air mixed gas upstream of the catalyst.

A preferred further development of the invention provides for a heater installed in a primary air conduit for indirect heating of the process air to be provided as heating device.

In a further preferred further development of the invention, the apparatus comprises a process air compressor with an intermediate cooler, with a regulated process air-side bypass around the intermediate cooler being provided in order to set the exit temperature of the air exiting from the process air compressor.

In a further preferred further development of the apparatus of the invention, the apparatus comprises means for heating or cooling the ammonia/air mixed gas by mixing-in of steam upstream and/or downstream of the process air compressor.

A preferred further development of the invention provides for the apparatus to comprise means for introduction of a fuel gas, in particular for introduction of hydrogen as fuel gas, in order to increase the burner temperature and heat the air and/or the ammonia/air mixed gas before contact with the catalyst.

A preferred further development of the invention provides for the apparatus to comprise at least one regulating circuit in order to set the amount of heating and/or cooling medium fed into the heating or cooling device and/or to adjust the setting of the process air compressor.

For example, the regulating circuit comprises a cascade regulation, with a temperature regulator being provided for measuring the temperature of the catalyst gauze, which temperature regulator is in active communication with a flow regulator for the heating and/or cooling medium.

Possible variants of the present invention are the following embodiments denoted by the Roman numerals I to XXV:

I Process for the catalytic oxidation of ammonia gas by means of an oxygen-containing gas, in particular by means of air, in the presence of a catalyst to give nitrogen monoxide in an oxidation reactor, characterized in that the reaction temperature at the catalyst is influenced to bring it to an optimum value in respect of the nitrogen monoxide selectivity of the reaction, with this influencing being effected by means of measures upstream of the oxidation reactor.

II Process according to embodiment I, characterized in that the air and/or the ammonia/air mixed gas, in particular the ammonia/air mixture, are indirectly heated or cooled before contact with the catalyst.

III process according to embodiment II, characterized in that indirect heating of the air and/or the ammonia/air mixed gas by means of steam or another heat transfer medium, in particular by means of residual gas and/or secondary air and/or electric power, is provided.

IV Process according to either of embodiments II and III, characterized in that the catalytic oxidation is carried out in a plant comprising a process air compressor with an intermediate cooler, with a regulated process air-side bypass around the intermediate cooler being provided in order to set the exit temperature of the air exiting from the process air compressor.

V Process according to any of embodiments I to IV, characterized in that the air and/or the ammonia/air mixed gas are directly heated or cooled before contact with the catalyst.

VI Process according to embodiment V, characterized in that the catalytic oxidation is carried out in a plant comprising a process air compressor and the process air stream is mixed with at least one hot medium and/or at least one cold medium upstream or downstream of the process air compressor.

VII Process according to embodiment VI, characterized in that demineralized water and/or liquid nitrogen and/or cold water, in particular from the $NH_3$ vaporization, is used as cold medium.

VIII Process according to either of embodiments VI and VII, characterized in that mixing of the hot or cold medium with the total air stream or only with the primary air is provided.

IX Process according to any of embodiments VI to VIII, characterized in that heating by mixing-in of steam upstream of the process air compressor is provided.

X Process according to any of embodiments VI to IX, characterized in that heating or cooling of the ammonia/air mixed gas by mixing-in of steam downstream of the process air compressor is provided.

XI Process according to any of embodiments V to X, characterized in that the air and/or the ammonia/air mixed gas is heated before contact with the catalyst, with the use of a fuel gas, in particular the use of hydrogen as fuel gas, for increasing the burner temperature being provided, with the introduction of a fuel gas occurring into the air stream in the region of the conduit upstream of the addition of ammonia with combustion of this fuel gas.

XII Process according to any of embodiments V to XI, characterized in that introduction of a fuel gas or a medium which influences the temperature of the reaction over the catalyst upstream of the addition of ammonia is provided, with the combustion of this fuel gas occurring at the catalyst in the ammonia burner.

XIII Process according to embodiment XI or XII, characterized in that a first introduction of a fuel gas or of a medium which influences the temperature of the reaction over the catalyst is provided upstream of the addition of ammonia and a further introduction of a fuel gas or of a medium which influences the temperature of the reaction over the catalyst is provided downstream of the addition of ammonia.

XIV Process according to any of embodiments II to XIII, characterized in that indirect heating or cooling of the air by means of a first indirect heat transfer before the addition of ammonia is provided and/or indirect heating or cooling of the ammonia/air mixed gas by means of a second heat transfer after the addition of ammonia is provided.

XV Process according to any of embodiments I to XIV, characterized in that the catalytic oxidation is carried out in a plant comprising a process air compressor and a change in the temperature of the combustion air brought about by changing at least one setting parameter of the process air compressor is provided, preferably by means of a change in the setting of the blades of the process air compressor.

XVI Process according to any of embodiments I to XV, characterized in that the intended value of the temperature of the catalyst gauze is determined as a function of at least one modeling parameter, with, in particular, the $NH_3$ concentration and/or the plant load and/or the burner pressure being selected as modeling parameters, using a regulating circuit in order to set the amount of heating or cooling medium fed in and/or to adjust the setting of the process air compressor.

XVII Process according to embodiment XVI, characterized in that a cascade control. is used, with the output of a temperature regulator for the temperature of the catalyst gauze providing the intended value for a flow regulator for the heating and/or cooling medium.

XVIII Process according to either of embodiments XVI and XVII, characterized in that a model for the behavior of the plant in respect of variations in the amounts of heating medium and/or cooling medium and/or changes in the settings of the process air compressor is set up using plant data and also theoretical approaches, with a feed-forward control. with feedback trim being used.

XIX Apparatus for carrying out a process for the catalytic oxidation of ammonia gas by means of an oxygen-containing gas, in particular by means of air, in the presence of a catalyst to give nitrogen monoxide, preferably for carrying out the process according to any of embodiments I to XVIII, characterized in that this apparatus comprises means for setting the temperature of an ammonia/air mixed gas before contact with the catalyst.

XX Apparatus according to embodiment XIX, characterized in that it comprises at least one heating device and/or at least one cooling device for the air and/or the ammonia/air mixed gas upstream of the catalyst.

XXI Apparatus according to embodiment XX, characterized in that a heater installed in a primary air conduit is provided as heating device for indirect heating of the process air.

XXII Apparatus according to any of embodiments XIX to XXI, characterized in that it comprises a process air compressor with an intermediate cooler, with a regulated process air-side bypass around the intermediate cooler for setting the exit temperature of the air exiting from the process air compressor being provided.

XXIII Apparatus according to any of embodiments XIX to XXII, characterized in that it comprises means for heating or cooling the ammonia/air mixed gas by mixing-in of steam upstream and/or downstream of the process air compressor.

XXIV Apparatus according to any of embodiments XIX to XXIII, characterized in that it comprises means for introduction of a fuel gas, in particular for introduction of hydrogen as fuel gas, in order to increase the burner temperature and heat the air and/or the ammonia/air mixed gas before contact with the catalyst.

XXV Apparatus according to any of embodiments XIX to XXIV, characterized in that it comprises at least one regulating circuit in order to set the amount of heating and/or cooling medium fed into the heating or cooling device and/or to adjust the setting of the process air compressor.

XXVI Apparatus according to embodiment XXV, characterized in that the regulating circuit comprises a cascade control, with a temperature regulator for measuring the temperature of the catalyst gauze, which regulator is in active communication with a flow regulator for the heating and/or cooling medium, being provided.

In preferred variants of the present invention, the term "influencing" is, in particular, used in the sense of "regulating", i.e. targeted controlling of the reaction temperature and not a coincidental influence. In these preferred variants of the present invention, the formulation "influencing of the reaction temperature at the catalyst" can be replaced by the formulation "regulation of the reaction temperature of the catalyst". This applies both to the processes according to the invention and to the apparatuses according to the invention, with, in the case of the latter, "means for regulating the temperature" accordingly being present instead of "means for setting the temperature".

In these variants in particular, the temperature at the catalyst gauze is measured and proceeding from these measured values other process parameters, as are described in the dependent claims, are then regulated so that the reaction temperature at the catalyst is kept as close as possible to a targeted value.

This makes it possible, as per the objective, to maintain the ideal reaction temperature at the catalyst and achieve an optimum reaction.

In one variant, the present invention provides a process for the catalytic oxidation of ammonia gas by means of an oxygen-containing gas, in particular by means of air, in the presence of a catalyst to give nitrogen monoxide in an oxidation reactor, with regulation of the reaction temperature at the catalyst to an optimum value in respect of the nitrogen monoxide selectivity of the reaction being provided and this regulation being carried out by means of measures upstream of the oxidation reactor, characterized in that the ammonia/air mixed gas is indirectly heated or cooled before contact with the catalyst.

In a further variant, the regulation is carried out explicitly without saturation of ammonia with water vapor.

A working example of the present invention will be described in more detail below with reference to FIG. 1. The depiction schematically shows, in greatly simplified form, the elements essential to the present invention of a plant for the catalytic oxidation of ammonia gas. The plant comprises an ammonia burner 10, a conduit 11 for introduction of ammonia into the conduit system and a compressor 12 to which process air is fed via a conduit 13, so as to compress the process air to a prescribed pressure by means of the compressor 12. The compressed process air flows via a conduit 14 which goes out from the compressor 12 and into which a fuel gas 21, for example natural gas, is introduced via the conduit 15 and goes firstly to an indirect heat exchanger 16 in which a first regulation of the temperature of the process gas mixture is effected, in the working example before the addition of ammonia via the conduit 11 to the process gas mixture composed of air and fuel gas. Combustion can be effected by means of the fuel gas 21 fed in at 15, or media which allow the temperature of the process gas mixture to be influenced are fed in at 15.

After the addition of ammonia gas via the conduit 11, the process gas mixture flows via the conduit 17 through a further indirect heat exchanger 18 in which a second regulation of the temperature of the process gas mixture can be effected. The process gas mixture is subsequently fed via the conduit 19 to the ammonia burner 10, with, however, introduction of a further fuel gas 22, for example hydrogen, being able to be provided via the conduit 20 in order to assist the oxidation of the ammonia/air mixture at the catalyst. As an alternative, media which make it possible to influence the temperature of the process gas mixture can also be fed in via the conduit 20.

The process of the present invention thus makes it possible to set the reaction temperature of the process gas mixture at the catalyst in the ammonia burner to intended optimized values at a number of points, firstly by changing the air temperature at the compressor 12. A second possible way of influencing the temperature is the addition of fuel gas or other suitable media via the conduit 15. A third possible way of influencing the temperature is the use of an indirect heat exchanger 16 upstream of the addition of ammonia. A fourth possible way of influencing the temperature is the use of a further indirect heat exchanger 18 downstream of the addition of ammonia. A fifth possible way of influencing the temperature is the addition of a fuel gas or suitable media via the conduit 20 downstream of the second indirect heat exchanger 18 and upstream of the ammonia burner 10.

LIST OF REFERENCE NUMERALS

10 Ammonia burner
11 Conduit for the addition of ammonia
12 Compressor for process air
13 Conduit for the addition of air
14 Conduit for process gas mixture
15 Conduit for the addition of a fuel gas
16 First indirect heat exchanger
17 Conduit for process gas mixture
18 Second indirect heat exchanger
19 Conduit for process gas mixture
20 Conduit for the addition of fuel gas
21 Fuel gas
22 Further fuel gas

What is claimed is:

1. A process for catalytic oxidation of ammonia gas by way of an oxygen-containing gas in a presence of a catalyst to give nitrogen monoxide in an oxidation reactor, the process comprising regulating a reaction temperature at the catalyst to an optimum value with respect to nitrogen monoxide selectivity of a reaction of catalytic oxidation of ammonia gas, wherein the regulating is effected by way of measures upstream of the oxidation reactor, wherein the oxygen-containing gas is air, the process comprising directly heating or cooling the air and/or the ammonia gas/air mixed gas before contact with the catalyst, wherein the process further comprises introducing upstream of the addition of the ammonia gas a first fuel gas that influences the reaction temperature, with combustion of the fuel gas occurring at the catalyst.

2. The process of claim 1 wherein the oxygen-containing gas is air, the process comprising indirectly heating or cooling the air and/or the ammonia gas/air mixed gas before contact with the catalyst.

3. The process of claim 2 comprising indirectly heating the air and/or the ammonia gas/air mixed gas by way of steam or other heat transfer medium.

4. The process of claim 2 wherein the catalytic oxidation occurs in a plant comprising a process air compressor with an intermediate cooler and a regulated process air-side bypass around the intermediate cooler for setting an exit temperature of air exiting from the process air compressor, wherein the process air compressor provides said air.

5. The process of claim 4 wherein the catalytic oxidation occurs in a plant comprising a process air compressor, the process comprising mixing a process air stream with a hot medium and/or a cold medium upstream or downstream of the process air compressor.

6. The process of claim 5 wherein the cold medium comprises at least one of demineralized water, liquid nitrogen, or water from $NH_3$ vaporization.

7. The process of claim 5 wherein the ammonia gas is mixed with primary air prior to or during the catalytic oxidation of the ammonia gas to form the nitrogen monoxide, wherein the nitrogen monoxide is thereafter mixed with secondary air for oxidation to form nitrogen dioxide, wherein a total air stream includes the primary air and the secondary air, the process comprising mixing the hot medium or the cold medium with a total air stream or only with the primary air.

8. The process of claim 5 comprising heating by mixing in steam upstream of the process air compressor.

9. The process of claim 5 comprising heating or cooling the ammonia gas/air mixed gas by mixing in steam downstream of the process air compressor.

10. A process for catalytic oxidation of ammonia gas by way of an oxygen-containing gas in a presence of a catalyst to give nitrogen monoxide in an oxidation reactor, the process comprising regulating a reaction temperature at the catalyst to an optimum value with respect to nitrogen monoxide selectivity of a reaction of catalytic oxidation of ammonia gas, wherein the regulating is effected by way of measures upstream of the oxidation reactor, wherein the oxygen-containing gas is air, the process comprising directly heating or cooling the air and/or the ammonia gas/air mixed gas before contact with the catalyst, wherein the process further comprises heating the air and/or the ammonia gas/air mixed gas before contact with the catalyst via a fuel gas for increasing a burner temperature, wherein the fuel gas is introduced into an air stream in a region of a conduit upstream of an addition of the ammonia gas with combustion of the fuel gas.

11. The process of claim 1 comprising introducing a second fuel gas or a second medium that influences the reaction temperature downstream of the addition of the ammonia gas.

12. The process of claim 1 wherein the oxygen-containing gas is air, the process comprising indirectly heating or cooling the air and/or the ammonia gas/air mixed gas before contact with the catalyst, the process comprising at least one of:
   indirectly heating or cooling the air by way of a first indirect heat transfer before adding the ammonia gas; or
   indirectly heating or cooling the ammonia gas/air mixed gas by way of a second heat transfer after adding the ammonia.

13. The process of claim 1 wherein a change in temperature of combustion occurs via changing a setting parameter of a process air compressor and wherein the process air compressor provides said air.

14. The process of claim 1 comprising determining a value of a temperature of a catalyst gauze as a function of an $NH_3$ concentration, a plant load, and/or a burner pressure by performing closed loop control and setting an amount of heating or cooling medium fed upstream of the oxidation reactor and/or adjusting a setting of a process air compressor, wherein the process air compressor provides said air.

15. The process of claim 14 comprising performing cascade control whereby an output of a temperature regulator for the temperature of the catalyst gauze provides the value of a temperature setting for a flow regulator for the heating or cooling medium.

16. The process of claim 14 comprising operating a plant in which the process is practiced by varying amounts of the heating or cooling medium and/or changing settings of the process air compressor using data measured during plant operation and performing a feed-forward control with feedback trim.

17. A process for catalytic oxidation of ammonia gas by way of an oxygen-containing gas in a presence of a catalyst to give nitrogen monoxide in an oxidation reactor, the process comprising regulating a reaction temperature at the catalyst to an optimum value with respect to nitrogen monoxide selectivity of a reaction of catalytic oxidation of ammonia gas, wherein the regulating is effected by way of measures upstream of the oxidation reactor, wherein the oxygen-containing gas is air, the process comprising directly heating or cooling the air and/or the ammonia gas/air mixed gas before contact with the catalyst, wherein the process further comprises introducing a first fuel gas or a first medium that influences the reaction temperature downstream of the addition of the ammonia gas, with combustion of the fuel gas occurring at the catalyst in an ammonia burner.

* * * * *